United States Patent [19]
Rehbein et al.

[11] Patent Number: 5,454,849
[45] Date of Patent: Oct. 3, 1995

[54] SOIL TREATMENT COMPOSITION

[75] Inventors: Gerald L. Rehbein, White Bear Lake; Paul D. Montain, Lino Lakes, both of Minn.

[73] Assignee: L & G Rehbein, Inc., Centerville, Minn.

[21] Appl. No.: 273,416

[22] Filed: Jul. 11, 1994

Related U.S. Application Data

[63] Continuation-in-part of Ser. No. 644,956, Jan. 22, 1991, Pat. No. 5,346,527.

[51] Int. Cl.⁶ .................................................. C05F 17/00
[52] U.S. Cl. .................... 71/12; 71/25; 71/63; 71/903
[58] Field of Search .......................... 71/1, 12, 13, 903, 71/25

[56] References Cited

U.S. PATENT DOCUMENTS

| | | | |
|---|---|---|---|
| 4,028,130 | 6/1977 | Webster et al. | 106/120 |
| 4,067,716 | 1/1978 | Sterrett | 71/24 |
| 4,180,459 | 12/1979 | Zievers | 71/12 |
| 4,203,376 | 5/1980 | Hood | 110/346 |
| 4,306,978 | 12/1981 | Wurtz | 71/12 X |
| 4,354,876 | 10/1982 | Webster | 106/85 |
| 4,385,500 | 5/1983 | Kjelgaard et al. | 71/903 |
| 4,902,431 | 2/1990 | Nicholson et al. | 210/751 |

*Primary Examiner*—Ferris Lander
*Attorney, Agent, or Firm*—Robert C. Baker

[57] ABSTRACT

Two nuisance waste products, namely sewage sludge ash and water treatment lime, are mixed together to provide an agricultural soil treatment composition which enhances the nutrient value and raises the pH of the soil for improved plant growth while simultaneously minimizing the risk of wind blown ash dust.

10 Claims, 1 Drawing Sheet

SOIL TREATMENT COMPOSITION

CROSS-REFERENCE TO RELATED APPLICATION

This application is a continuation-in-part of our application Ser. No. 07/644,956, filed Jan. 22, 1991, now U.S. Pat. No. 5,346,527, Sep. 13, 1994.

BACKGROUND OF THE INVENTION

This invention relates to a compositiom for treating agricultural soil so as to enhance the nutrient value and raise the pH of the soil for improved plant growth. The composition uses two nuisance waste products.

The incineration of sewage sludge has been done for decades with the resulting ash presenting a disposal problem. Although its limited application on agricultural soil for its nutrient value (e.g., plant-available phosphorus and potassium and multiple trace elements or micronutrients), has heretofore been recognized, it has not received any widespread use as a soil conditioner. Some may say that the phosphorus in it available for plant growth is relatively low; but the plant-available phosphorus in it is sufficient to be meaningful for plant growth. Not insignificant is its fine particle size, down to even less than a micron. It dries readily even when applied as a liquid or a paste; and its extremely fine particles are easily wind driven. It must be worked into the soil relatively quickly after application; the relatively quick tillage requirements for land applied sewage sludge itself (for reasons of the stench as well as concerns of wind blown dust on drying) have been considered equally applicable to the ash. Thus, maintaining reliable relatively uniform land coverage of it in a windy environment has made it relatively unattractive to work with as an agricultural soil conditioner.

Water treatment lime, that is, the lime by-product of municipal water softening operations, also has been for decades a waste product. For years it was considered useless. However, it has over the past several years received attention as a soil conditioner, especially for raising the pH of acid soils. As such it has been employed with success and with convenient maintenance of relatively uniform land coverage even in windy environments, largely because of its relatively strong tendency to retain or attract water and also because of its relatively sand particle size when dry.

Both waste products, namely the sewage sludge ash and the water treatment lime, have presented environmental concerns for decades. Despite the fact that each heretofore has been separately proposed for use on agricultural soil, with application of water treatment lime on agricultural soil being now a readily accepted practice, no one insofar as known has heretofore proposed or recognized the unique benefit of combining these waste products to solve the vexing problems associated with tonnage scale land application of sewage sludge ash. It is to a solution of those vexing problems that this invention is directed.

SUMMARY OF THE INVENTION

Agricultural soil for treatment according to the invention should have an acid pH below 6.5 and a plant-available phosphorous level not over about 400 pounds per acre. Such agricultural soil or land will be enhanced in nutrients and raised in pH for improved plant growth when treated with the sewage sludge ash and water treatment lime mixture according to the principles and teachings of the invention. Simultaneously, the risk of wind blown sewage sludge ash as a dust is greatly minimized, even though the quantity of sewage sludge ash solids applied to land in admixture with the water treatment lime solids in accordance with the invention is two to six times the weight of the water treatment lime of the mixture. The invention thus affords highly significant volume usage of sewage sludge ash and does so in a convenient manner making the land treatment readily acceptable to farmers for the benefits gained, including enhancement of nutrient value and the raising of the pH of the soil for improved crop growth.

After preliminarily analyzing the agricultural soil to be treated in accordance with the invention, the first significant step is that of mixing tonnage quantities of sewage sludge ash with water treatment lime in a manner and to a degree sufficient to form a relatively uniform mixture of the ash and lime waste. The sewage sludge ash fed to mixing equipment will have a solids ash content between 35 and 100 percent and water content between 0 and 65 percent. The water treatment lime will have a solids lime content between 10 and 70 percent and a water content between 30 and 90 percent. These percentages are all by weight. The mixing is at a site remote from the agricultural soil to be treated simply because of the size of the equipment required for handling tonnage quantities in the mixing step. The mixed material will not only be of relatively uniform nature but also will contain sufficient water to cause the mixture to exhibit a liquid or pasty spreadable consistency.

A characteristic of the mixture is that it will have a weight ratio between about 2 and 6 parts of sewage sludge ash solids to one part of water treatment lime solids. This ratio is believed to be surprisingly high for the ash solids. The weight ratio for a particular mixture to be used on a specific area of agricultural soil is predetermined from the preliminary analysis of the agricultural soil contemplated for treatment. The preliminary analysis is to determine the preexisting pH and plant-available phosphorous level of the soil. Treatment according to the teachings of the invention is not recommended for agricultural soil having an acidity pH of 6.5 or above or agricultural soil having plant-available phosphorus at a level over about 400 pounds per acre prior to treatment. The specific ratio of ash solids to lime solids is reduced commensurately with a reduced pH of the soil to be treated with the mixture.

The ash solids have a constituent content including phosphorus and potassium, and if it contains the following heavy metals, they will not be present in an amount exceeding the following approximate weight percentages of the ash solids:

| | |
|---|---|
| Cadmium | 0.2% |
| Copper | 1.4% |
| Lead | 0.26% |
| Nickel | 1.10% |
| Zinc | 1.40% |

After blending the ash and the water treatment lime, the resulting mixture is transported from the mixing site to the agricultural soil on which the mixture is to be applied.

The resulting water-containing mixture is then spread on agricultural soil in a relatively uniform manner at a quantity between 2 and 70 tons of the mixture per acre of the agricultural soil. The quantity spread per acre is sufficient to raise the level of the pH of the acid soil but not above about 7.5. Further, the quantity spread per acre will be insufficient to add to the agricultural soil more than two pounds per acre of cadmium in any one year, and insufficient to add to that soil more than the following lifetime limits for additions of the following heavy metals:

| | |
|---|---|
| Cadmium | 20 pounds per acre |
| Copper | 500 pounds per acre |
| Lead | 200 pounds per acre |
| Nickel | 200 pounds per acre |
| Zinc | 1,000 pounds per acre |

Where the mixture to be applied to the soil is a liquid consistency, it generally will contain more than 55 percent water by weight; and such a mixture is transported in a tanker truck to the agricultural land to be treated and then spread on that soil by a liquid applicator.

Most sewage sludge ash for the practice of the invention has a particle size distribution wherein at least about 50 percent by weight of the particles are smaller than 75 microns or 200 mesh U.S. standard. Generally at least about 20 percent by weight of the particles are smaller than 2 microns in size. The small size of the particles has been a characteristic of sewage sludge ash production; but the largest size particles (but still on the order of sand particles in size) are also useful in practice of the invention.

Pasty consistency mixtures are desirable for the practice of the invention and generally will contain at least about 25 percent but no more than about 55 percent water by weight. Pasty mixtures contribute to economy of delivery or transport of the mixture from the mixing site to the farmland to be treated. In essence, the pasty mixture can be delivered using trucking equipment other than tanker trucks. For example, huge trucks of the semitrailer type may be employed. The pasty mixture also is economically spread on land using solid waste applicators, including manure spreaders.

Additional features and benefits of the invention will be evident as this description proceeds.

DESCRIPTION OF THE PREFERRED EMBODIMENT

Figure 1:
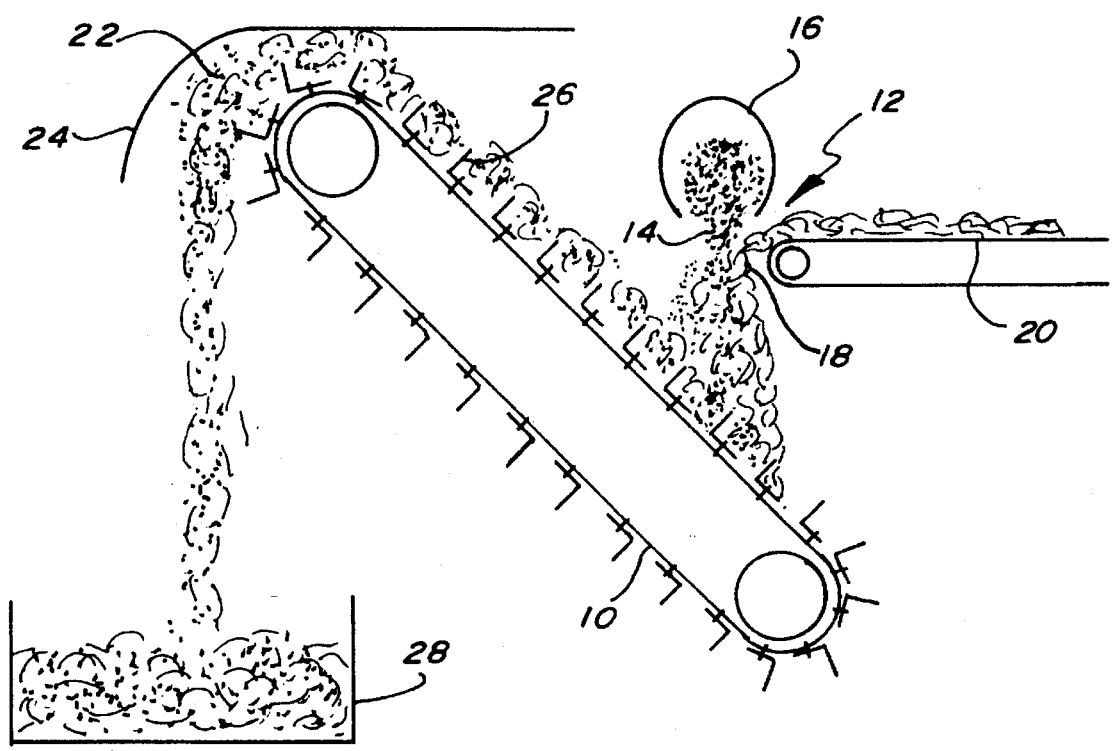
FIG. 1 is a schematic side view of key elements of a mixing apparatus for practice of the invention.

After a field or ground area of agricultural soil is selected for possible treatment according to the teaching of the invention, one of the first concerns is to establish the suitability of the area for treatment consistent with environmental laws and regulations. Aerial photos, special maps and soil surveys will usually be consulted at this preliminary stage; and the agricultural soil will be analyzed.

Analysis of the soil is done to determine a minimum of two factors, specifically its soil-water pH and plant-available phosphorus content; but the analysis generally will include a determination of other factors such as the potassium level and the buffer index. Well-known procedures are used in conducting the soil analysis and there is no need to repeat those here.

However, note should be made that a known buffer index test is the SMP Buffer Test For Lime, developed by Shoemaker, McLean, and Pratt from Ohio State University. It provides a relatively accurate base for approximating the amount of lime needed to raise the soil-water pH of soil containing sufficient organic matter or clay to create a reserve acidity factor not revealed by the conventional water-soil pH test. Such soils may test to have the same pH as other soils, but they require more lime to effect elevation of pH than an equal pH soil containing lesser amounts of organic matter or clay. The pH of the SMP buffer solution itself is 7.5. When that buffer is added to a soil, the original pH of the SMP buffer will decrease. Since it is known how much acid is required to lower the SMP buffer to any given pH level, the total acidity of the soil can be determined (i.e. taking into account the amount of reserve acidity caused by organic matter as well as the clay ion exchange sites.) For example, a soil with a soil-water pH of 5.4 might bring the SMP buffer pH index from 7.5 to 6.3. A field having a soil-water pH of 5.4 and a buffer pH index of 6.3 will require about 5.5 tons per acre of solid or dry lime to reach the 6.5 pH level. It is emphasized that the soil analysis tests provide the basis for reasonable tonnage application estimates. The invention contemplates handling huge quantities of material and there is no pretesting known that will permit absolute figures as to the exact amount of material per acre needed to raise the soil-water pH of a particular field of land from that of its pretreatment soil-water pH to a pH of precisely 6.5 or some other figure. It should be added however that where the pretreatment soil-water pH is 6.0 or higher, the SMP buffer test is not significant inasmuch as the relative error for it is so high that it is not a helpful indicator for determining the addition of basic matter needed to neutralize or raise the acid soil-water pH of the soil.

The plant-available phosphorous content in soil is always significant for plant growth but should not exceed certain levels, as dictated by environmental considerations. The main purpose for determining the plant-available phosphorous content of soil prior to treatment according to the invention is so as to avoid treating lands having a plant-available phosphorous level of over about 400 pounds per acre (as determined by the known citric acid soluble phosphorous test). Plant-available phosphorus is phosphorus in a chemical complex which plants will pick up during growth. It is fertilizer phosphorus. Other forms of phosphorus are not relevant to the analysis.

Extensive analysis of the pretreatment condition of land may be conducted, and may be governmentally required by environmental agencies. The two main tests of soil-water pH and plant-available phosphorus should always be conducted. Soil having a pH of 6.5 or higher or a plant-available phosphorus over about 400 pounds per acre should not be treated in the manner taught by the invention.

Two major waste products are mixed together in the practice of the invention; both will vary in composition but the dominant characteristics of each will be explained.

SEWAGE SLUDGE ASH

The sewage sludge ash employed in practicing the invention is that from the incineration or burning of sewage sludge. Such sludge is a mass of waste products, not solely the waste of human excrement. Further, water is always employed in moving sewage to the sewage plants where the incineration takes place; and water itself varies in the amount of different ingredients which may be dissolved or carried by it. Industrial waste in the past has contributed to great variation of the content of sewage sludge, and therefore the ash resulting from the burning or incineration of it; but industrial waste is becoming more and more subject to governmental regulations which in turn should gradually reduce special variations of ash content caused by different industries.

While sewage sludge contains sulfates from human waste and also frequently some cyanide and nitrogen in other forms, plus carbon compounds, the effect of the burning or incineration is such as to volatize or burn out most of those constituents. (The volatized environmentally harmful gaseous matter from incineration is properly precipitated or otherwise removed from the gases to avoid release of the same into the atmosphere.)

Following now are six examples of analysis of different sewage sludge ashes for different constituents, mainly metals as present in the ashes. The metals of course will generally be in an oxidized state.

TABLE I

ASH ELEMENT ANALYSES
Concentration (% dry wt.)

| Constituent | 1 | 2 | 3 |
|---|---|---|---|
| Chlorine | 0.05 | 0.145 | 0.150 |
| Fluorine | 0.01 | 0.017 | 0.032 |
| Oxygen | 32.5 | 43.52 | 36.16 |
| Sulfur | 0.13 | 0.230 | 0.180 |
| Silicon | 18.16 | 18.0 | 28.0 |
| Carbon | 0.55 | 0.55 | 0.75 |
| Hydrogen | 0.23 | 0.17 | 0.04 |
| Nitrogen | 0.039 | 0.048 | 0.050 |
| Phosphorus | 2.78 | 8.12 | 4.37 |
| Copper | 0.47 | 0.650 | 0.360 |
| Nickel | 0.013 | 0.082 | 0.052 |
| Lead | 0.053 | 0.095 | 0.087 |
| Zinc | 0.15 | 0.520 | 0.390 |
| Cadmium | 0.001 | 0.006 | 0.002 |
| Chromium | 0.027 | 0.285 | 0.210 |
| Potassium | 0.66 | 0.490 | 0.490 |
| Iron | 3.53 | 4.20 | 2.90 |
| Calcium | 11.6 | 8.80 | 8.20 |
| Aluminum | 2.31 | 6.50 | 5.50 |
| Manganese | 0.73 | 0.210 | 0.085 |
| Magnesium | 1.59 | 1.50 | 1.08 |
| Sodium | 0.47 | 0.240 | 0.330 |
| Barium | 0.14 | 0.625 | 0.450 |
| Beryllium | 0.0001 | 0.00013 | 0.00009 |
| Silver | 0.031 | 0.039 | 0.016 |
| Selenium | <0.0004 | 0.00018 | 0.00019 |
| Antimony | 0.006 | 0.014 | 0.013 |
| Arsenic | <0.0002 | | |
| Total | 76.2 | 95.056 | 89.897 |

Note: To convert percent dry weight to weight parts per million, multiply the percent figure by 10,000; thus 0.50 percent dry weight becomes 5,000 parts per million dry weight.

TABLE II

Ash Element Analyses
(parts per million dry weight)

| Constituent | 4 | 5 | 6 |
|---|---|---|---|
| Aluminum | 51,000 | 76,100 | 65,900 |
| Antimony | 15 | | |
| Arsenic | 23 | | |
| Barium | 1,900 | 1,770 | 1,920 |
| Beryllium | <1 | 1.5 | 2.55 |
| Bismuth | 29 | | |
| Cadmium | 90 | 106 | 12 |
| Calcium | 61,000 | 73,800 | 204,000 |
| Chromium | 790 | 2,660 | 2,000 |
| Cobalt | 23 | 29 | 5 |
| Copper | 3,800 | 3,540 | 4,150 |
| Gold | <10 | | |
| Iron | 38,000 | 47,200 | 49,700 |
| Lead | 700 | 1,300 | 100 |
| Lithium | <1 | | |
| Magnesium | 16,000 | 19,500 | 19,400 |

TABLE II-continued

Ash Element Analyses
(parts per million dry weight)

| Constituent | 4 | 5 | 6 |
|---|---|---|---|
| Manganese | 2,200 | 1,520 | 924 |
| Mercury | <1 | | |
| Molybdenum | 36 | 160 | 170 |
| Nickel | 470 | 409 | 168 |
| Niobium | 14 | | |
| Phosphorus | | 48,400 | 71,400 |
| Potassium | 2,400 | 12,700 | 13,100 |
| Rubidium | 34 | | |
| Scandium | <10 | | |
| Silicon | | 227,000 | 142,000 |
| Silver | 220 | 180 | 657 |
| Sodium | 5,000 | 9,900 | 8,900 |
| Strontium | 290 | 307 | 419 |
| Thallium | 6 | 33 | 17 |
| Tin | 460 | | |
| Titanium | 9,700 | 10,100 | 5,110 |
| Tungsten | 28 | 95.0 | 43.6 |
| Uranium | 7 | | |
| Vanadium | 110 | | |
| Yttrium | 12 | | |
| Zinc | 4,400 | 6,000 | 2,320 |
| Zirconium | | 271 | 124 |

The following table lists the major element constituents of sewage sludge ash and an approximate average presence of the same in such ash, plus the normal (or likely possible) range variation for them in such ash. The quantities are in parts per million.

TABLE III

Major Element Constituent
(mg/kg or ppm by Weight)

| | |
|---|---|
| Aluminum | 70,000 (20,000 to 80,000) |
| Barium | 2,000 (1,500 to 6,000) |
| Calcium | 80,000 (70,000 to 200,000) |
| Cadmium | 50 (5 to 100) |
| Chromium | 800 (400 to 2,800) |
| Copper | 4,000 (2,000 to 7,000) |
| Iron | 40,000 (30,000 to 50,000) |
| Lead | 800 (100 to 1,300) |
| Magnesium | 20,000 (10,000 to 42,000) |
| Manganese | 2,000 (900 to 3,000) |
| Nickel | 300 (100 to 500) |
| Potassium | 5,000 (2,000 to 13,000) |
| Sodium | 3,000 (2,000 to 10,000) |
| Phosphorus | 60,000 (40,000 to 80,000) |
| Silicon | 200,000 (100,000 to 250,000) |
| Titanium | 8,000 (5,000 to 10,000) |
| Zinc | 5,000 (1,000 to 7,000) |

For practice of the invention, ashes having even higher content of some metals than that above illustrated may be employed, but the content of the following heavy metals should not exceed the following approximate weight percentages of the dry ash solids:

| | |
|---|---|
| Cadmium | 0.02% |
| Copper | 1.40% |
| Lead | 0.26% |
| Nickel | 0.10% |
| Zinc | 1.40% |

A comparison of an average of ash water leach chemical characteristics against drinking water standards provides some insight as to the characteristics of sewage sludge ash. The following table supplies such a comparison in milligrams per liter.

| Parameter | Ash Leach | Drinking Water Standards |
|---|---|---|
| pH | 8.9 | — |
| Arsenic | 0.0044 | 0.05 |
| Barium | 0.33 | 1.0 |
| Boron | 0.53 | — |
| Cadmium | 0.0035 | 0.01 |
| Chromium | 0.0227 | 0.05 |
| Copper | 0.0352 | — |
| Iron | 0.03 | — |
| Lead | 0.0019 | 0.05 |
| Manganese | 0.03 | — |
| Mercury | 0.0005 | 0.002 |
| Nickel | 0.0179 | — |
| Selenium | 0.0321 | 0.01 |
| Silver | 0.0033 | 0.05 |
| Sulfate | 1,016.0 | — |
| Zinc | 0.0091 | — |

A major problem with sewage sludge ash is that it tends to dry rapidly even when applied in a wet condition on soil. In dry condition, the bulk density of the ash may vary from about 30 to 60 pounds per cubic foot. The fine particle size, however, becomes especially evident when spread and dried. The loose fine particles are easily air driven. Even the coarsest of ashes have been found to be made up of at least 50 percent by weight of particles finer than about 75 microns or 200 mesh, with at least about 98 percent by weight of the particles passing through a screen of ¼ inch and at least about 5 percent by weight of the particles less than about 2 microns in size. Even 5 percent by weight of particles smaller than about 2 microns can present serious dust problems when dry.

The finest of ashes as collected in a silo frequently consist of at least 90 percent by weight of particles finer than 75 microns or 200 mesh and at least about 20 percent of the weight thereof made up of particles smaller than about 2 microns. Silo ashes are substantially free of water and almost invariably are made up of at least about 50 percent by weight of particles smaller than 75 microns. Because of their small particle sizes, they present an especially serious problem of dust when applied alone on land.

Ash is generally collected in silos from there, if it cannot be utilized directly, it is stored in lagoons and may contain as much as 65 percent water by weight at the time of mixing it with water treatment lime in practicing the invention.

Of course, the pathogens of waste sewage sludge are killed during incineration.

WATER TREATMENT LIME

Many large cities have lime disposal problems which arise as a result of using lime to effect a degree of softening of water to be supplied through the city water mains. The resulting water treatment lime or byproduct lime remains a strong source of calcium carbonate and to some and varying extent a source of magnesium hydroxide. Initially, the lime to be used in the water softening process is that known as calcium oxide. The softening process occurring when that lime is added to water, involves the reaction of the calcium oxide with the water to yield calcium hydroxide. Water itself may contain calcium bi-carbonate as a factor causing its hardness. The calcium hydroxide and the calcium bi-carbonate react to precipitate calcium carbonate plus water. Another ingredient common to many waters is magnesium bi-carbonate; and this reacts with calcium hydroxide to yield calcium carbonate plus magnesium carbonate and water. The magnesium carbonate further reacts with calcium hydroxide to form magnesium hydroxide and calcium carbonate. The calcium carbonate and any magnesium hydroxide are the primary constituents of the waste product water treatment lime. Other elements may also be extracted from water of hard character subjected to the lime treatment softening process; but the other elements, while likely present in many situations, are present only to a relatively modest degree and the following analysis of waste product water treatment lime is but illustrative:

|  | #/Ton | ppm | % |
|---|---|---|---|
| Cyanide | 0.007 | 3.3 | .0003 |
| Manganese | 1.86 | 932.0 | .0932 |
| Iron | 6.33 | 3,163.0 | .3163 |
| Arsenic | 0.013 | 6.3 | .0006 |
| Cadmium | 0.026 | 13.0 | .0013 |
| Hexavalent chromium | 0.012 | 6. | .0006 |
| Copper | 0.032 | 16.0 | .0016 |
| Lead | 0.134 | 67.0 | .0067 |
| Zinc | 0.1 | 50.0 | .0050 |
| Mercury | — | 0.23 | .000023 |
| Sulfate | 4.0 | 1,998.0 | .1998 |
| pH = 9.6 | | | |

The lime waste product of water softening has a solids content of calcium carbonate of at least about 80 percent by weight, and generally at least about 85 percent calcium carbonate by solids weight. The magnesium hydroxide content may average about 3 percent by solids weight and will generally include a content or an amount of at least about a 0.5 percent of magnesium hydroxide. Remaining ingredients may vary depending on the analysis of the water subjected to the lime softening process as well as the exact formula of the lime employed in that process. It is rare that the lime employed in the process is totally free of other constituents; but they are essentially insignificant to the treatment process and only become of interest when the resulting water treatment lime byproduct is analyzed. The essential point is that the water treatment lime byproduct is an exceedingly high source of calcium and it has been successfully employed as a material for increasing the pH of acid soil with no harmful effect whatsoever on any vegetation.

A still further significant feature of the water treatment lime as a byproduct is its tendency to retain water. It only slowly releases the water on drying and has presented problems to efforts to dry it or remove the lime solids from the water before discharging the remaining water free of solids back into a river. The lime from the water treatment generally will contain about two-thirds of its weight as water with about one-third as solids, but sometimes may contain as much as 90 percent water by weight. It rarely is available for use according to the invention with as little as 30 percent water by weight. Reducing the water content to a level of 65 percent with 35 percent solids is about the maximum realistic reduction economically accomplished within a reasonable period of time. Thus water treatment lime employed in the practice of the invention is a solution or dispersion of solids material, primarily calcium carbonate, and will have a solids content possibly varying from about 10 to 70 percent by total weight at the outer extremes. Efforts to dry a lagoon of this product generally end up with the surface caking over and leaving the underlying strata with its water more or less "locked" in place. After application upon agricultural soil, the waste lime will slowly dry as a result of its water being taken up by the soil and evaporating. In spread and dried condition, it exhibits a sandy particle size not easily wind driven. It does not harden as a uniform cake on land application, and any larger hunks of that may exist on land drying are easily crumbled by plowing or tilling the land.

MIXING

Mixing the required tonnage quantities of the two waste materials together is conducted at a facility located near the ash generating plant. The water treatment lime is transported to the mixing facility in tankers when the lime contains large amounts of water; but lime containing as much as 50 percent or 55 percent water by weight can be transported in open trucks since it is relatively solid and is slow in drying and little danger of dust loss arises in transporting it. Ash on the other hand requires precautions to prevent dust loss of it and random distribution of it when it is transported alone.

The mixing itself is conducted in a manner to effect substantially uniform blending of the materials. Batch mixing in paddle mixers or cement mixers is useful. Continuous feed and discharge mixers are preferable. Liquid waste water lime is suitably pumped to the mixing equipment (or if of pasty consistency, fed on a conveyor); the ash preferably in dampened mixture-containing condition is conveyed on a belt conveyor to it. Proportions of the two waste products are adjusted by varying the pumping rate and the belt travel rate or loading on the belt. A simplified highly effective continuous mixer developed for processing the tonnage quantities of liquid waste lime and silo ash (preferably with moisture), or lagoon ash, relies upon an angularly inclined cleated high speed belt 10 enclosed in any suitable chamber having a common entrance 12 for the materials (i.e., pumped waste water lime 14 dumped from conduit 16 and ash 18 dumped from conveyor 20) and a single exit 22 under deflector 24 at the elevated end of the belt. Materials deposited on the belt are whipped and beaten into blended condition by the cleats 26 and speed of the belt (about 2500 rpm) while the angle of incline (preferably about 40 degrees plus or minus 5 degrees) serves to cause portions of material to fall downwardly on the cleated belt for further whipping. The cleats 26 suitably may be formed by riveting angle irons transversely across the belt 10. The material thrown out the exit 22 of the chamber into any suitable collection container 28 is well blended and the process, despite the large quantities handled, is exceedingly fast.

The weight ratio of ash solids to lime solids for the mixture is always maintained between about two and six parts ash to one of the water treatment lime. This ratio is determined for each acreage of agricultural soil to be treated. If the soil pretested to have a low or highly acid pH such as, for example, a pH of 4.0 (which is rare), the quantity of ash mixed with the lime will be lowered toward that near or at about two parts by weight of ash solids to about one part by weight of lime solids. Also, if the heavy metal content of an ash is toward the higher figures in Table III, the weight ratio of ash to lime generally will be reduced toward that of two parts ash to one of lime. Primarily, however, it is the acid condition of the soil to be treated that is the determining factor for varying the weight ratio of ash to lime.

The sewage sludge ash mixed will have a solids ash content between 35 and 100 percent and from 0 to 65 percent water by weight, whereas the lime solids content may vary from 10 to 70 percent by weight with between 30 and 90 percent water. The mixture itself will always contain at least 25 percent water by weight for handling properties in mixing as well as for later spreading on land. The total water of the mixture should not exceed 75 percent and preferably the materials being mixed are such that the water content of the mixture will not exceed 75 percent by weight. Above that water content the mixture becomes too diluted for economical handling.

An illustrative preferred formula for mixing according to the invention is set forth in the following table. The ash contained 20 percent water (80 percent solids) by weight and the lime contained 45 percent water (55 percent solids) by weight.

| PREFERRED PRODUCT FORMULA (mg/kg or ppm by Dry Weight) | | |
|---|---|---|
| Constituent | Sewage Sludge Ash | Water Treatment Lime |
| Cyanide | <.01 | <1.0 |
| Fluoride | 900 | 3.1 |
| Sulfate | 5,600 | 70.0 |
| Aluminum | 70,000 | 1,400 |
| Arsenic | 31 | <2.0 |
| Barium | 2,000 | 230 |
| Boron | — | 590 |
| Cadmium | 60 | <.5 |
| Calcium | 80,000 | 230,000 |
| Chromium | 800 | 3.9 |
| Copper | 4,000 | 33 |
| Iron | 40,000 | 1,300 |
| Lead | 800 | <2.5 |
| Magnesium | 20,000 | 7,600 |
| Manganese | 2,000 | 85 |
| Mercury | <.005 | <.02 |
| Molybdenum | — | <50 |
| Nickel | 300 | <1.5 |
| Nitrogen | — | 1,100 |
| Phosphorus | 60,000 | 180 |
| Potassium | 5,000 | 22 |
| Selenium | .0002 | <.25 |
| Silver | 120 | 3.8 |
| Sodium | 3,000 | 120 |
| Zinc | 5,000 | <1.0 |
| Moisture Content | 20 | 45 |
| pH | 8.8 | 10.1 |

TRANSPORT OF MIXTURE

When the water content of the mixture of ash and lime is more than 55 percent by total weight, the transport of the mixture to the site for soil application is best accomplished by tanker truck. The tanker truck may be equipped with a liquid applicator for splash or spray distribution of the mixture on the soil.

Mixtures having a water content of no more than 55 percent by weight, and preferably no more than 50 percent by weight (but at least 25 percent by weight) are most conveniently and economically transported by trucks which have an open top for the truck box. Such mixtures have a pasty or mashed potato consistency and behave similarly to dampened soil, and even have the appearance of dampened soil.

APPLICATION OF MIXTURE

To realize the agricultural benefits of the mixture, it is spread in a relatively uniform manner on the agricultural soil.

Liquid applicators such as sprayers or splashing equipment may be employed for mixtures of liquid consistency (e.g., mixtures containing over 55 percent water by weight).

Preferred mixtures are those containing no more than 55 percent water by weight but at least 25 percent by weight; and these are spread on the soil by solid waste applicators such as manure spreaders.

The rate of spreading is maintained between about 2 to 70 water-containing tons per acre, with that rate generally between 10 and 35 water-containing tons per acre. The rate is estimated based on the pretreatment soil analysis. Sufficient quantity per acre is spread to raise the pH of the soil preferably to a value of at least 6.5 but not above about 7.5.

Importantly, the quantity of application to the soil will comply with governmental limitations. Thus the quantity will be insufficient to add more than 2 pounds per acre of cadmium in any one year and insufficient to add more than the following lifetime limits for addition of the following heavy metals:

| | |
|---|---|
| Cadmium | 20 pounds per acre |
| Copper | 500 pounds per acre |
| Lead | 2,000 pounds per acre |
| Nickel | 200 pounds per acre |
| Zinc | 1,000 pounds per acre |

The application of liquid mixture interestingly is frequently on the order of thickness of a dime (U.S. currency).

FEATURES

Research by others (particularly Dr. Carl Rosen of the University of Minnesota) on the effect of sewage sludge ash on plant growth and the pick up by plant (tissue analysis) of constituents of sewage sludge ash has indicated that lettuce and corn can successfully be grown in pure ash without soil with no apparent detrimental effects to growth even where increasing levels of extractable cadmium have been present. Neither the lettuce nor corn leaves appeared to accumulate this metal in one experiment. The experiment was not to prove that such lettuce should be marketed in the food chain, but to demonstrate nutrient value and safety of the ash. The important observation to be made is that additions of sewage sludge ash to the soil provides benefits for the growth of plants and benefits in using waste sewage sludge ash for soil amendment.

The phosphorus of the ash contributes to the plant-available phosphorus needed by plants. Not all of the phosphorus of the ash is plant available; however, about one-tenth to about one-third of the phosphorus in the ash is usually in a form which is plant available, and therefore contributes to plant growth comparably to the phosphorus of the conventional N-P-K fertilizer of common usage.

Another macronutrient needed by plants is potassium. It is a common constituent of sewage sludge ashes.

Trace elements or micronutrients such as copper, zinc, boron, magnesium, manganese and sulfur are also needed by plants for healthy growth; and these elements are frequently present in the sewage sludge ash.

Other metals such as cadmium, chromium, nickel, and lead are also frequently present in the ash. The cadmium detection limit in plants is about 0.5 mg/kg, and plants of known experiments have not reached that limit. Likewise, while plants will accumulate or pick up some lead, nickel and chromium, the quantity of those metals accumulated in plant tissue is limited and experiments have indicated insufficient pick up to reach the standard detection limits.

The adjustment of soil pH effected by the mixture contributes not only to improved fertilizer and nutrient performance but also contributes to improved pesticide performance.

The invention may be practiced using other ashes or limes having properties substantially similar to those explained herein, without departing from the spirit or essential characteristics of the invention. For example, other ashes such as garbage ash may replace sewage sludge ash. Ag lime may replace water treatment lime. All changes which come within the meaning and range of equivalency of the claims are therefore intended to be embraced thereby.

Some illustrations of equivalence for subordinate matters can help to emphasize the key critical features of the invention. The key thrust of the invention is that of combining two waste components, namely sewage sludge ash and water treatment lime in a mixture for treating agricultural soil. The combination itself is unique and astonishingly unique in its high concentration of the sewage sludge ash solids relative to its water treatment lime solids. In this regard, this key essence of the invention is realized and maintained even when the sewage sludge ash employed in mixing is more diluted with water than is generally realistic (e.g., a dilution beyond the upper range of 65% aforementioned). Excessive water is not desired, but ash containing as much as 75% by weight water (with 25% by weight ash solids) can, when used, give the benefits of the invention for soil treatment. Similarly, the water treatment lime solids, if containing greater water than 90% (even 95%, although not desired), still can function to provide a resulting mixture of the ash and lime solids substantially satisfying the criterion of the water content within the approximate realistic range of 25% to 75% by weight of the total mixture.

Just as some variations in water content do not defeat the essence of the invention, so also variations (e.g., as allowed by governmental regulations) in the amount of heavy metals permissibly added to agricultural soil, as well as in sewage sludge ash itself, are of secondary importance in terms of the essence of the invention. The tolerable or allowable constituent content of heavy metals in sewage sludge ash permissible under federal regulations since our original application was filed on Jan. 22, 1991 has been increased. As of the filing of this continuation-in-part, the greater tolerable ash weight percentages allowed by the federal rules are:

| | |
|---|---|
| Cadmium | .035% |
| Copper | 3.73% |
| Lead | .34% |
| Nickel | 2.05% |
| Zinc | 3.48% |

Still further, the federal rules (as of the filing of this continuation-in-part) no longer limit the amount of cadmium that may be applied to agricultural soil in any one year, and provide new lifetime limits for additions of heavy metals as follows:

| | |
|---|---|
| Cadmium | 35 pounds per acre |
| Copper | 1,335 pounds per acre |
| Lead | 267 pounds per acre |
| Nickel | 374 pounds per acre |
| Zinc | 2,492 pounds per acre |

While mixing at a site remote from the agricultural field to be treated continues as the most practical approach for practicing the invention, it is distinctly possible and realistic to conduct mixing at a site on the agricultural field to be treated, or to conduct mixing during transport to an agricultural field, and to conduct mixing even as the new composition is being applied to a field. Tanker mixers having propellers for continually mixing or churning a liquid mass in the tanker are useful. For example, mixing may be accomplished in tanks of large capacity, even as large as 100,000 gallons, equipped with internal mixing propellers (e.g., propeller blades). Tonnage quantities, however, can also be mixed by propeller whipping or blending in smaller mixing tanks such as those of 6,000-gallon capacity; and mobile tankers equipped with internal mixing propeller blades or other means can also be useful in the practice of the invention. Most preferably, field mixing or in transit mixing in tankers is accomplished with components that give a mixture that, at the very least, exhibits a flowable and pumpable and also spreadable consistency analogous to that of a liquid; and this is true even when the percentage of water may be at a somewhat reduced level in the mixture (i.e., a reduced level of say 45% by weight of the total mixture). Generally a water content not lower than about 45% by weight will be the result of "on site" tanker mixing—mainly because (even if lime of relatively low water content is employed) the ash employed will almost invariably contain sufficient water to reduce dust problems during transport. The specific properties of the particular ash and lime solids in a mixture can have a significant bearing on and can cause variation of the minimal water that must be present for liquid performance. (Limes having lower weight percentages of calcium carbonate—but at least about 60% of their dry solids weight accounted for by calcium carbonate—are an example of those that can affect liquid performance of a mixture at water contents around or below 50%.)

Despite the specific nature of the starting sewage sludge ash and the water treatment lime, the true thrust of the invention is that it provides a unique new composition which utilizes two nuisance waste products for a new soil treatment. Advantageously, liquid compositions give a "white washed" appearance to an agricultural field—a feature contributing to the ready acceptance and success of the invention.

That which is claimed is:

1. A composition for treating agricultural soil having a soil-water acid pH below 6.5 and a plant-available phosphorus level not over about 400 pounds per acre, said composition being for enhancing the nutrient value and raising the pH of the treated soil for improved plant growth, said composition comprising a mixture of sewage sludge ash solids and water treatment lime solids and a sufficient content of water to cause said mixture to exhibit a liquid or pasty spreadable consistency, said water content being at least about 25 percent and not over about 75 percent by weight of said mixture, said ash solids having a constituent content including phosphorus and potassium, and said mixture having a weight ratio between about two and six parts of sewage sludge ash solids to one part by weight of water treatment lime solids.

2. The composition of claim 1 wherein said mixture is flowable and pumpable as a liquid.

3. The composition of claim 1 wherein said mixture contains more than 55% water by weight.

4. The composition of claim 1 wherein the sewage sludge ash in said mixture has a particle size distribution such that at least about 50 percent by weight of the particles are smaller than 75 microns and at least 20 percent by weight of the particles are smaller than 2 microns.

5. The composition of claim 1 wherein said mixture is of pasty consistency.

6. The composition of claim 1 wherein said mixture contains at least 25 and no more than 55 percent water by weight.

7. The composition of claim 1 wherein the constituent analysis of said sewage sludge ash does not contain more than the following upper limits in weight parts per million of ash solids for the following constituents:

| Aluminum | 80,000 |
|---|---|
| Barium | 6,000 |
| Calcium | 200,000 |
| Cadmium | 100 |
| Chromium | 2,800 |
| Copper | 7,000 |
| Iron | 50,000 |
| Lead | 1,300 |
| Magnesium | 42,000 |
| Manganese | 3,000 |
| Nickel | 500 |
| Potassium | 13,000 |
| Sodium | 10,000 |
| Phosphorus | 80,000 |
| Silicon | 250,000 |
| Titanium | 10,000 |
| Zinc | 7,000. |

8. The composition of claim 1 wherein the water treatment lime solids has a calcium carbonate content of at least about 80% by weight.

9. A composition for treating agricultural soil having a soil-water acid pH below 6.5 and a plant-available phosphorus level not over about 400 pounds per acre, said composition being for enhancing the nutrient value and raising the pH of the treated soil for improved plant growth, said composition comprising a mixture of sewage sludge ash solids and water treatment lime solids and a sufficient content of water to cause said mixture to exhibit a liquid or pasty spreadable consistency, said water content being at least about 25 percent and not over about 75 percent by weight of said mixture, said ash solids having a constituent content including phosphorus and potassium, and said mixture having a weight ratio between about two and six parts of sewage sludge ash solids to one part by weight of water treatment lime solids, and wherein said composition is contained within a mobile tanker.

10. The composition of claim 9 wherein said mobile tanker is equipped with a liquid applicator for distribution of said composition on agricultural soil.

* * * * *